US009699520B2

(12) United States Patent
Ejima et al.

(10) Patent No.: US 9,699,520 B2
(45) Date of Patent: Jul. 4, 2017

(54) VIDEO RECEIVING APPARATUS AND METHOD OF CONTROLLING INFORMATION DISPLAY FOR USE IN VIDEO RECEIVING APPARATUS

(71) Applicant: Panasonic Intellectual Property Management Co., Ltd., Osaka (JP)

(72) Inventors: Masataka Ejima, Osaka (JP); Kenji Takita, Osaka (JP); Hiroyuki Yoshida, Kanagawa (JP); Mitsuhiro Mori, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 17 days.

(21) Appl. No.: 14/857,476

(22) Filed: Sep. 17, 2015

(65) Prior Publication Data

US 2016/0014478 A1    Jan. 14, 2016

Related U.S. Application Data

(63) Continuation of application No. PCT/JP2014/000318, filed on Jan. 23, 2014.

(30) Foreign Application Priority Data

Apr. 17, 2013 (JP) ................................. 2013-086954

(51) Int. Cl.
*G06F 3/00* (2006.01)
*G06F 13/00* (2006.01)
(Continued)

(52) U.S. Cl.
CPC ..... *H04N 21/8133* (2013.01); *H04N 21/4316* (2013.01); *H04N 21/44008* (2013.01); *H04N 21/4722* (2013.01); *H04N 21/4828* (2013.01)

(58) Field of Classification Search
None
See application file for complete search history.

(56) References Cited

U.S. PATENT DOCUMENTS 6,928,262 B1 *  8/2005  Kanemitsu ............. H04H 60/47
                                                           348/14.01
7,876,381 B2    1/2011  Kasano
(Continued)

FOREIGN PATENT DOCUMENTS

JP    9-233442 A    9/1997
JP    2003-333445 A    11/2003
(Continued)

OTHER PUBLICATIONS

European Search Report issued in European Application No. 14784862.6 dated Feb. 23, 2016.
(Continued)

*Primary Examiner* — William J Kim
(74) *Attorney, Agent, or Firm* — McDermott Will & Emery LLP

(57) ABSTRACT

A video receiving apparatus includes: a receiving unit which receives video content; an extracting unit which extracts a partial content which is a portion of the video content by analyzing the video content, to obtain a feature of the partial content item, the feature being characteristic within the video content; an information generating unit which generates a composition information item indicating the partial content item and including at least one of a character and an image; a priority setting unit which sets a priority of the composition information item based on the feature obtained from the partial content item, the priority indicating a degree of association between the video content and the composition information item; and a display control unit which controls display of the composition information item on a
(Continued)

display screen according to the priority of the composition information item set by the priority setting unit.

15 Claims, 11 Drawing Sheets

(51) Int. Cl.
*H04N 5/445* (2011.01)
*H04N 7/173* (2011.01)
*H04N 21/81* (2011.01)
*H04N 21/431* (2011.01)
*H04N 21/44* (2011.01)
*H04N 21/4722* (2011.01)
*H04N 21/482* (2011.01)

(56) References Cited

U.S. PATENT DOCUMENTS

| | | | |
|---|---|---|---|
| 9,032,472 B2 | 5/2015 | Mertens | |
| 2002/0112249 A1* | 8/2002 | Hendricks | H04H 20/10 |
| | | | 725/136 |
| 2003/0093794 A1* | 5/2003 | Thomas | G06F 17/30017 |
| | | | 725/46 |
| 2004/0008277 A1 | 1/2004 | Nagaishi et al. | |
| 2006/0136226 A1* | 6/2006 | Emam | H04N 5/222 |
| | | | 704/277 |
| 2007/0033170 A1* | 2/2007 | Sull | G06F 17/30796 |
| 2007/0252913 A1* | 11/2007 | Minobe | H04N 5/44513 |
| | | | 348/465 |
| 2008/0019669 A1* | 1/2008 | Girshick | G06F 17/30793 |
| | | | 386/224 |
| 2008/0266449 A1* | 10/2008 | Rathod | G06F 17/30796 |
| | | | 348/468 |
| 2009/0154890 A1* | 6/2009 | Nakamura | G06F 17/30029 |
| | | | 386/240 |
| 2009/0256959 A1 | 10/2009 | Kondo et al. | |
| 2009/0322943 A1 | 12/2009 | Kasano | |
| 2010/0332560 A1* | 12/2010 | Gerbasi, III | G11B 27/034 |
| | | | 707/812 |
| 2011/0102674 A1 | 5/2011 | Mertens | |
| 2011/0182512 A1 | 7/2011 | Nishi | |
| 2012/0120296 A1* | 5/2012 | Roberts | H04N 21/4126 |
| | | | 348/333.12 |
| 2012/0128241 A1* | 5/2012 | Jung | G06F 17/30855 |
| | | | 382/165 |
| 2014/0022459 A1 | 1/2014 | Mertens | |

FOREIGN PATENT DOCUMENTS

| | | |
|---|---|---|
| JP | 2006-238149 A | 9/2006 |
| JP | 2006-293912 A | 10/2006 |
| JP | 2006-340136 A | 12/2006 |
| JP | 2007-300323 A | 11/2007 |
| JP | 2010-011332 A | 1/2010 |
| WO | 2009/147590 A2 | 12/2009 |

OTHER PUBLICATIONS

International Search Report issued in Application No. PCT/JP2014/000318 dated Apr. 8, 2014.

* cited by examiner

FIG. 3

| Partial content item | Type | Display position | Display size | Character size |
|---|---|---|---|---|
| 211 | Object image | (600, 0) | (600, 400) | — |
| 212 | Character region image | (100, 0) | (500, 200) | 40 |
| 213 | Character region image | (300, 800) | (500, 150) | 50 |
| 214 | Character region image | (1000, 750) | (500, 200) | 20 |

301

| Partial content item | Composition information item |
|---|---|
| 211 | ![411, 412] , Ibata |
| 212 | World baseball, Second round, Japan vs Taiwan |
| 213 | 3, Ibata, (37) |
| 214 | One of the best baseball players, batting control, situational, hitting, appealing |

VIDEO RECEIVING APPARATUS AND METHOD OF CONTROLLING INFORMATION DISPLAY FOR USE IN VIDEO RECEIVING APPARATUS

CROSS REFERENCE TO RELATED APPLICATIONS

This is a continuation application of PCT International Application No. PCT/JP2014/000318 filed on Jan. 23, 2014, designating the United States of America, which is based on and claims priority of Japanese Patent Application No. 2013-086954 filed on Apr. 17, 2013. The entire disclosures of the above-identified applications, including the specifications, drawings and claims are incorporated herein by reference in their entirety.

FIELD

The present disclosure relates to a video receiving apparatus and a method of controlling information display for use in the video receiving apparatus.

BACKGROUND

Japanese Unexamined Patent Application Publication No. 2006-340136 discloses a video reproducing terminal which creates an index that is retrievable by performing character recognition upon video information obtained from a video broadcast. The video reproducing terminal allows a user to retrieve and view a desired scene in video.

SUMMARY

The present disclosure provides a video receiving apparatus which presents a retrieval item that facilitates selection for a user.

A video receiving apparatus according to the present disclosure includes: a receiving unit configured to receive video content; an extracting unit configured to extract a partial content item which is a portion of the video content by analyzing the video content, to obtain a feature of the partial content item which has been extracted, the feature being characteristic within the video content; an information generating unit configured to generate a composition information item from the partial content item, the composition information item indicating the partial content item and including at least one of a character and an image; a priority setting unit configured to set a priority of the composition information item generated from the partial content item, based on the feature obtained from the partial content item, the priority indicating a degree of association between the video content and the composition information item; and a display control unit configured to control display of the composition information item on a display screen according to the priority of the composition information item set by the priority setting unit.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a diagram explaining a feature quantity of the partial content item according to the embodiment.

DESCRIPTION OF EMBODIMENT

Hereinafter, non-limiting embodiments are described in greater detail with reference to the accompanying Drawings. However, there are instances where excessively detailed description is omitted. For example, there are instances where detailed description of well-known matter and redundant description of substantially identical components are omitted. This is for the purpose of preventing the following description from being unnecessarily redundant and facilitating understanding of those skilled in the art.

It should be noted that the accompanying Drawings and subsequent description are provided by the inventors to allow a person of ordinary skill in the art to sufficiently understand the present disclosure, and are thus not intended to limit the scope of the subject matter recited in the Claims.

Embodiment

The following describes an embodiment of the present disclosure with reference to FIG. 1 to FIG. 11. A video receiving apparatus according to the present disclosure is a video receiving apparatus which is effective in presenting a retrieval item that facilitates selection for a user.

[1-1. Configuration]

Figure 1:
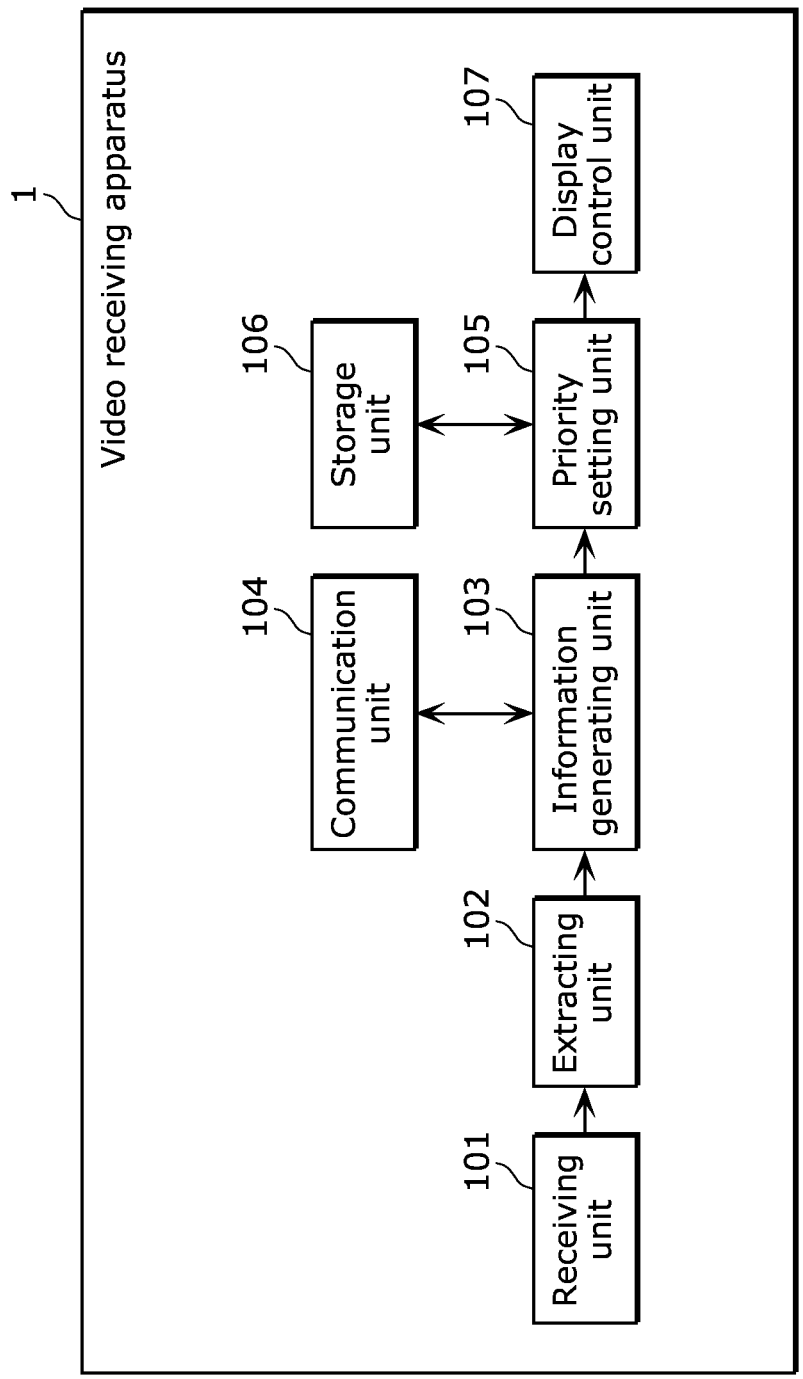
FIG. 1 is a functional block diagram illustrating a video receiving apparatus according to an embodiment.

FIG. 1 is a functional block diagram illustrating a video receiving apparatus according to the present embodiment.

As illustrated in FIG. 1, a video receiving apparatus 1 includes: a receiving unit 101; an extracting unit 102; an information generating unit 103; a communication unit 104; a priority setting unit 105; a storage unit 106; and a display control unit 107.

The receiving unit 101 receives video content. Here, examples of the video content include a content item distributed by terrestrial broadcasting or internet protocol (IP) broadcasting, a content item recorded on a recording media, and the like. The video content includes video, and may also include audio or meta-information that contains information indicating a genre of the video content. The receiving unit 101 receives the video content using an antenna and a receiving circuit which are for receiving terrestrial broadcasting, and a communication interface for receiving IP broadcasting, etc.

The extracting unit 102 analyzes the video content received by the receiving unit 101, thereby extracting a partial content item that is a portion of the video content. The extracting unit 102 then obtains a feature of the extracted partial content item. The partial content item is an image (object image) of a region in which an object such as a person is displayed in an image included in the video content, an image (character region image) corresponding to a region in which a character is displayed in an image included in the video content, audio included in the video content, or meta-information included in the video content. In addition, the feature is a feature of the partial content item which is characteristic within the video content, and the feature is indicated by a numerical value which is referred to as a feature quantity.

More specifically, when the partial content item is an object image, the feature quantity is a display size or a display position of the partial content item within the image. In other words, the extracting unit 102 obtains, as the feature (feature quantity), at least one of the display size and the display position of the object image within the image.

In addition, when the partial content item is a character region image, the feature quantity is a display size, a display position, or a display color of the partial content item in the image. In other words, the extracting unit 102 obtains, as the feature (feature quantity), at least one of the display position, the display color, and a character size, of the character region image within the image.

In addition, when the partial content item is audio, the feature quantity is a sound pressure (sound volume), a pitch, or a tempo. In other words, the extracting unit 102 obtains, as the feature (feature quantity), at least one of the sound pressure (sound volume), the pitch, and the tempo of the audio. The partial content item and the feature value will be described later in detail.

The information generating unit 103 generates, from a partial content item extracted by the extracting unit 102, a composition information item which is information indicating the partial content item and including a character or an image. More specifically, when the partial content item is an object image, the composition information item is a name or abbreviated name of a person corresponding to the object image, or the object image itself. In addition, when the partial content item is a character region image, the composition information item is a character (character string) displayed in the character region image. Furthermore, when an audio is used as the partial content item, the composition information item is a character (character string) resulting from converting the audio.

It is to be noted that, in order to convert an object image into, for example, a name of a person corresponding to the object image, it is possible to use an existing technique such as image retrieval using an external retrieval device (for example, a search site on the Internet). In this case, the information generating unit 103 communicates with the search device via the communication unit 104, thereby exchanging a retrieval item (retrieval subject) and a retrieval result. More specifically, the information generating unit 103 transmits an object image to the retrieval device via the communication unit 104, and receives a retrieval result (name, abbreviated name, etc.) transmitted from the retrieval device as a response, via the communication unit 104. It is to be noted that a character (character string) is obtained from a character region image or audio by recognizing a text included in the character region image or audio using a known character-recognition technique or speech-recognition technique, and then disassembling the text into a character (character string) by applying a morphological analysis technique to the text.

The communication unit 104 is an interface for communicating with an external communication device via a communication network, and used when the information generating unit 103 communicates with the retrieval device. Upon receiving an object image from the information generating unit 103, the communication unit 104 converts the received object image into data in a format allowing transmission to the communication network and transmits the data to the communication network. In addition, upon receiving a retrieval result from the communication network, the communication unit 104 transfers the received retrieval result to the information generating unit 103. It is to be noted that the above-described communication network includes a communication network of any type, such as a communication network, a metro network, a corporate intranet, and a home network, which includes a public phone line, a mobile phone line, a satellite communication line, or a data communication line.

The priority setting unit 105 sets, to a composition information item, a priority that indicates a degree of association between the video content and the composition information item that is generated from the partial content item, based on the feature extracted from the partial content item. The priority will be explained in detail below.

When a display size of an object image or a character region image is used as a feature quantity, the priority setting unit 105 sets a higher value to the priority (in other words, sets a value indicating a higher priority) of the composition information item resulting from converting the object image or the character region image, as the display size increases. In addition, when a display position of an object image or a character region image is used as a feature quantity, the priority setting unit 105 sets a higher value to the priority of the composition information item resulting from converting the object image or the character region image, as a distance from the display position to the center of the image decreases. Furthermore, the priority setting unit 105 is capable of setting the priority based on a template in which a certain region in an image is indicated in association with a priority of the region. The method of setting a priority based on the template will be described later in detail.

In addition, when a display color of a character in a character region image is used as a feature quantity, the priority setting unit 105 sets a higher value to the priority of the composition information item resulting from converting the character region image, as a difference in a color or luminance increases between the display color of the character and a display color of a surrounding image. It is to be noted that, when a display color of a character in a character region image is used as a feature quantity, the priority setting unit 105 may set a lower value to a priority of the composition information item resulting from converting the character region image which is displayed by one of colors often used in general for displaying a character (for example, black or white), and may set a higher value to a priority of the composition information item resulting from converting the character region image which is displayed by a color different from the color often used in general for displaying a character (for example, red or yellow).

In addition, when a sound pressure (sound volume) of audio is used as a feature quantity, the priority setting unit 105 sets a higher value to a priority of the composition information item resulting from converting the audio, as the sound pressure increases. Furthermore, when a pitch of audio is used as a feature quantity, the priority setting unit 105 sets a higher value to the priority of the composition information item resulting from converting the audio, as the pitch increases. Furthermore, when a tempo of an audio is used as a feature quantity, the priority setting unit 105 sets a higher value to the priority of the composition information item resulting from converting the audio, as the tempo decreases. In addition, the priority setting unit 105 is capable of setting a priority of the composition information item based on association between terms (association dictionary).

Furthermore, a preference of a user may be reflected in the priority. To be specific, it is also possible that the video receiving apparatus 1 holds information indicating a preference of a user, such as a genre of video content preferred by the user, or a term indicating what the user prefers, and the priority setting unit 105 sets a higher value to a priority of the composition information item that matches or relates to information indicating a preference of the user, among composition information items.

It is to be noted that the priority of a composition information item may be a relative value. In addition, the priority may be calculated by, after numerical values are indicated respectively in the above-described methods of setting a priority, summing up the indicated numerical values. In this case, the priority of a composition information item is not a relative value but a value set for the composition information item. It is to be noted that the priority indicates the degree of association between video content and a composition information item generated from a partial content item, and thus the priority may be referred to also as a degree of association.

The storage unit 106 is a memory for storing a template, information indicating a preference of a user, and an association dictionary, which are used by the priority setting unit 105. The storage unit 106 stores, where necessary, information used by the priority setting unit 105 for setting a priority. It is to be noted that the storage unit 106 is implemented by, for example, a non-volatile recording medium such as an HDD (hard disk drive), an SSD (solid sate drive), a flash memory, etc.

The display control unit 107 controls displaying of a composition information item on a display screen, according to the priority of the composition information item which has been set by the priority setting unit 105. More specifically, the display control unit 107 causes a composition information item to be displayed at a higher position on the display screen as the priority of the composition information item increases. In addition, the display control unit 107 may cause a composition information item to be displayed by a larger character on the display screen as the priority of the composition information item increases. Furthermore, the display control unit 107 may display a composition information item by a display color that is more strongly recognized by a user (red or yellow, for example) or by a deeper color, as the priority of the composition information item increases. In addition, the display control unit 107 may cause only a predetermined number of composition information items in descending order of priorities to be displayed on the display screen, and cause the rest of the composition information items not to be displayed on the display screen. It is to be noted that the display screen may be provided outside the video receiving apparatus 1, or included by the video receiving apparatus 1 as a display unit (not illustrated).

A user is allowed to view the composition information items displayed on the display screen, and upon specifying a composition information item in which the user is interested, obtain detailed information related to the specified composition information item (for example, a retrieval result when the specified composition information item is retrieved by a retrieval device). If a plurality of composition information items are simply displayed, it is impossible for a user to know which one of the plurality of composition information items has a higher degree of association with the details of the video content. The video receiving apparatus according to the present embodiment is capable of presenting, to a user, a plurality of composition information items together with a priority of each of the composition information items. The user is allowed to identify a composition information item to which a high priority is set, and then to obtain detailed information on the composition information item as necessary.

It is to be noted that each of the receiving unit 101, the extracting unit 102, the information generating unit 103, the communication unit 104, the priority setting unit 105, and the display control unit 107 is implemented by, for example, a non-volatile memory such as a ROM (read only memory) in which a program (application program, etc.) is stored, a CPU (central processing unit) which executes the program, and an RAM (random access memory) as a temporary operation region at the time of execution by the CPU. In addition, communication with an external device performed by the communication unit 104 is implemented by a communication interface (a wired LAN which complies with IEEE 802.3 standard, etc., a wireless LAN which complies with IEEE 802.11a/b/g standards, etc.).

Figure 2:
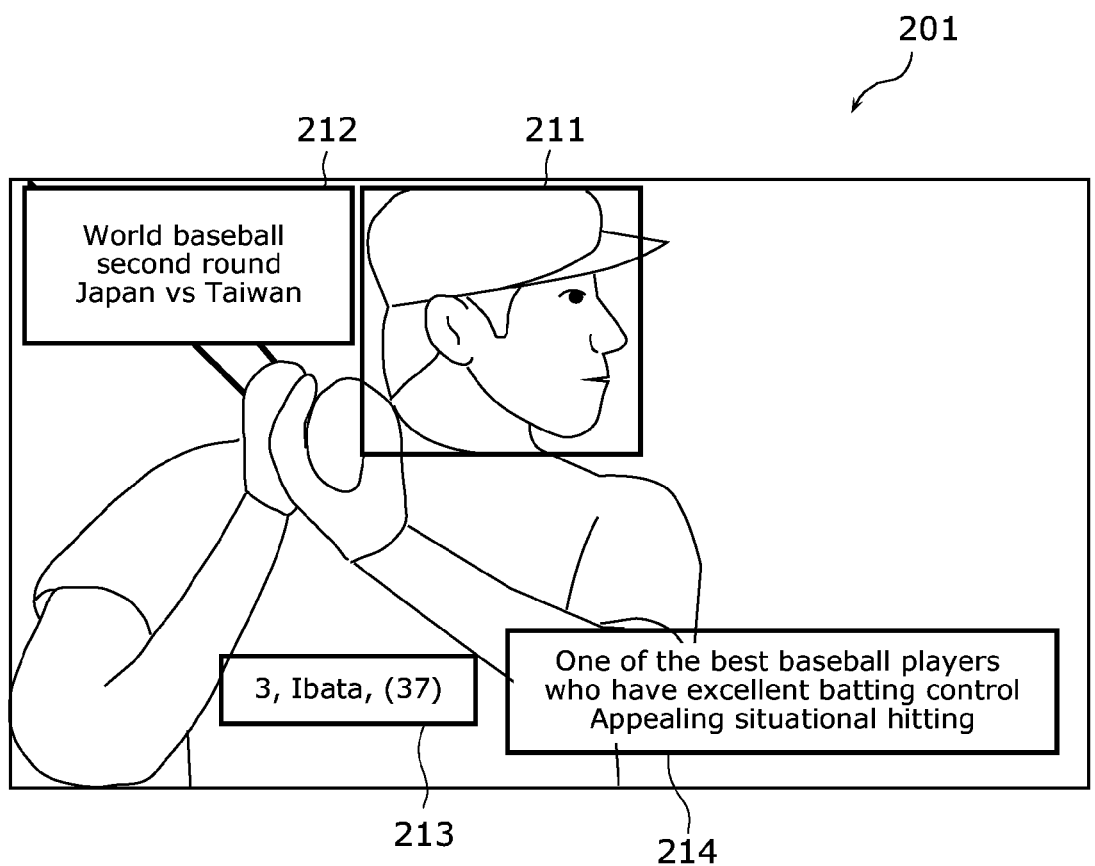
FIG. 2 is a diagram explaining extraction of a partial content item according to the embodiment.

FIG. 2 is a diagram explaining extraction of a partial content item according to the present embodiment. An image 201 illustrated in FIG. 2 is an example of an image included in video content. The image 201 includes an image of a person (face) that is an object, and character strings for a name and explanation of the person. The following describes a method of extracting a partial content item from the image 201 performed by the extracting unit 102.

The extracting unit 102 extracts, from the image 201, a portion including the object (object image) and a portion including the characters (character region image), as partial content items. Here, the portion including the object is an image including an object and an image in the vicinity of the object. This also holds true for the portion including the characters. For extracting an image of a person (face), it is possible to use known techniques (for example, a face recognition technique which recognizes a face by detecting a characteristic portion in a face such as an eye, a nose, a mouth, an outline, or the like, in an image). In addition, for extracting a character string, it is possible to use known techniques (for example, a character region detecting technique which separates a region including a character from other regions by binarizing colors of pixels included in the image). As described above, the extracting unit 102 extracts, as partial content items, an object image 211 and character region images 212, 213, and 214, which are included in the image 201.

It has been described here that the extracting unit 102 extracts, as partial content items, an object image and a character region image, from an image included in the video content. When the video content includes audio, the extracting unit 102 is capable of extracting the audio that is a partial content item, by separating the audio from the video content.

FIG. 3 is a diagram explaining a feature quantity of a partial content item according to the present embodiment. FIG. 3 illustrates a table 301 which indicates, for each of the partial content items extracted by the extracting unit 102 in FIG. 2, a type and a display position and a display size within an image, of the partial content item.

The extracting unit 102 obtains a display position and a display size, within an image, for each of the extracted partial content items (the object image 211 and the character region images 212 to 214). In addition, the extracting unit 102 obtains a character size for each of the character region images 212 to 214 which are partial content items. The display position is only required to be information that uniquely indicates a position of a partial content item within an image, and coordinates of an upper left corner of a partial content item may be used as the display position. In the following description, coordinates of an upper left corner of a partial content item is used as a display position. More specifically, a display position of the object image 211 is at coordinates of an upper left corner (600, 0) of the object image 211. Likewise, a display position of the character region image 212 is at coordinates (100, 0).

The display size is only required to be information uniquely indicating the size of the partial content item within an image, and a width in the lateral direction and a width in the vertical direction may be used, for example. In the following description, a width in the lateral direction and a width in the vertical direction are used as the display size. More specifically, a display size of the object image 211 is represented as (600, 400). Likewise, a display size of the character region image 212 is represented as (500, 200).

The size of a character is only required to be information uniquely indicating a size of a character in the character region, and a font size of the character may be used, for example. In the following description, a font size is used as the display size. To be specific, a size of a character of the character region image 212 is 40. Likewise, a size of a character of the character region image 213 is 50.

Figure 4:
FIG. 4 is a diagram explaining composition information items according to the embodiment.

FIG. 4 is a diagram explaining a composition information item according to the present embodiment.

FIG. 4 illustrates a table 401 which indicates a composition information item for each of the partial content items extracted by the extracting unit 102 in FIG. 2.

The information generating unit 103 converts the partial content item extracted by the extracting unit 102, into a composition information item which is information indicating the partial content item and including a character or an image. More specifically, the information generating unit 103 handles, as a composition information item, an object image 411 (equivalent to the object image 211) extracted as one of the partial content items. Next, the information generating unit 103 adds a character string 412 obtained by conversion through image retrieval from the object image 211, as a composition information item. In the same manner as above, the information generating unit 103 handles, as a composition information item, a character string included in the character region image 212 extracted as another one of the partial content items. It is to be noted that the character string 412 obtained by conversion through image retrieval may include a plurality of the character strings. In addition, the object image 411 and the character string 412 may be integrated and handled as one composition information item.

Figure 5:
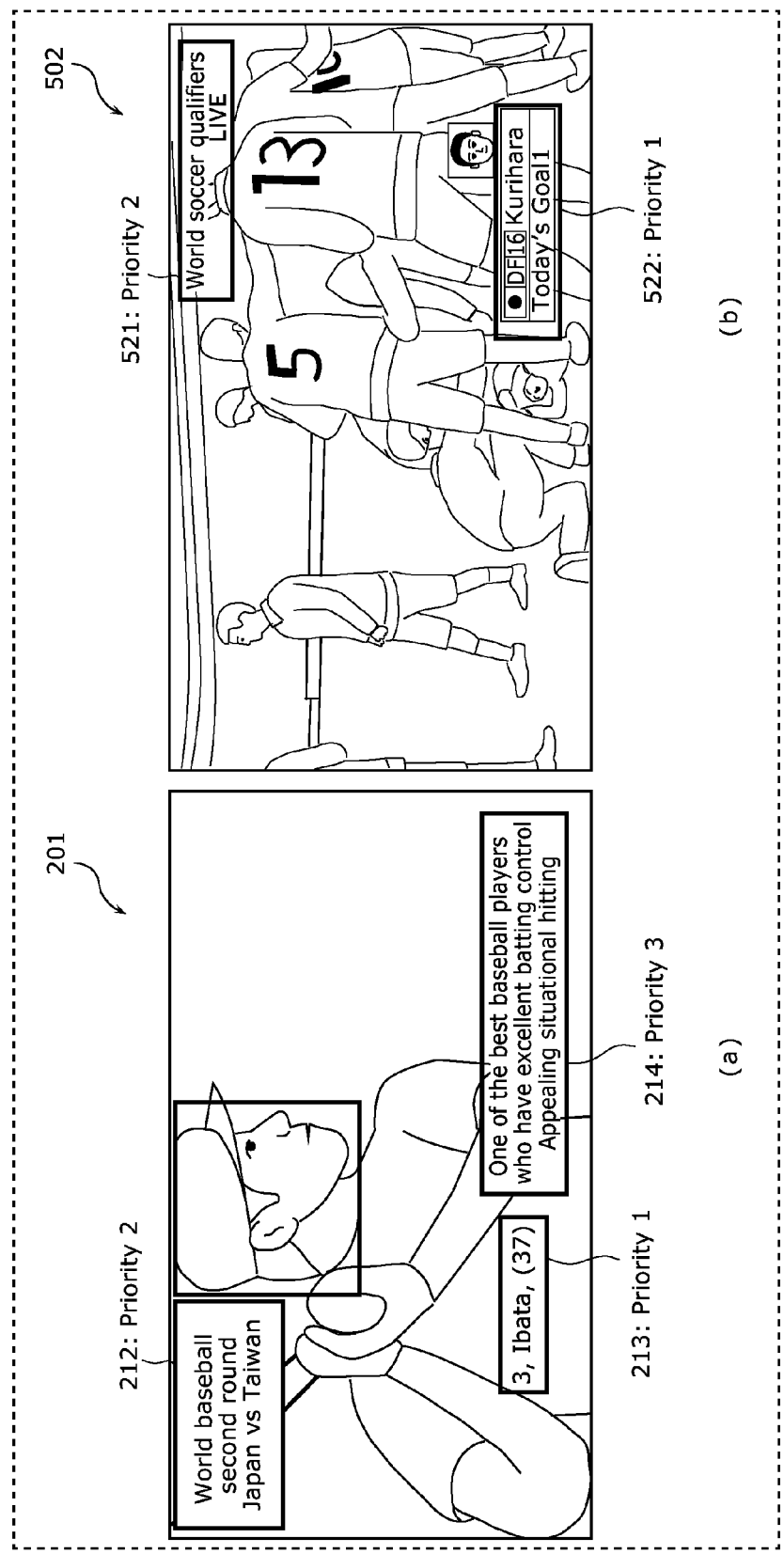
FIG. 5 is a first explanation diagram for a method of setting a priority according to the embodiment.

FIG. 5 is a first explanation diagram for a method of setting a priority according to the present embodiment. The following describes, with reference to FIG. 5, a method of setting a priority based on a character size, performed by the priority setting unit 105.

An image 201 illustrated in (a) in FIG. 5 includes character region images 212, 213, and 214 as partial content items. The priority setting unit 105 sets, based on a size of a character in each of the character region images, a higher priority to a composition information item of the character region image, as the character size increases. Here, the character sizes of the character region images 212, 213, and 214 are 40, 50, and 20, respectively. Accordingly, the priority setting unit 105 sets priorities 2, 1, and 3, to the composition information items of the character region images 212, 213, and 214, respectively. Here, the smaller the numerical value is, the higher the priority is.

In the same manner as above, the priority setting unit 105 sets priorities 2 and 1 to the composition information items of the character region images 521 and 522, respectively, included in an image 502 illustrated in (b) in FIG. 5.

Figure 6:
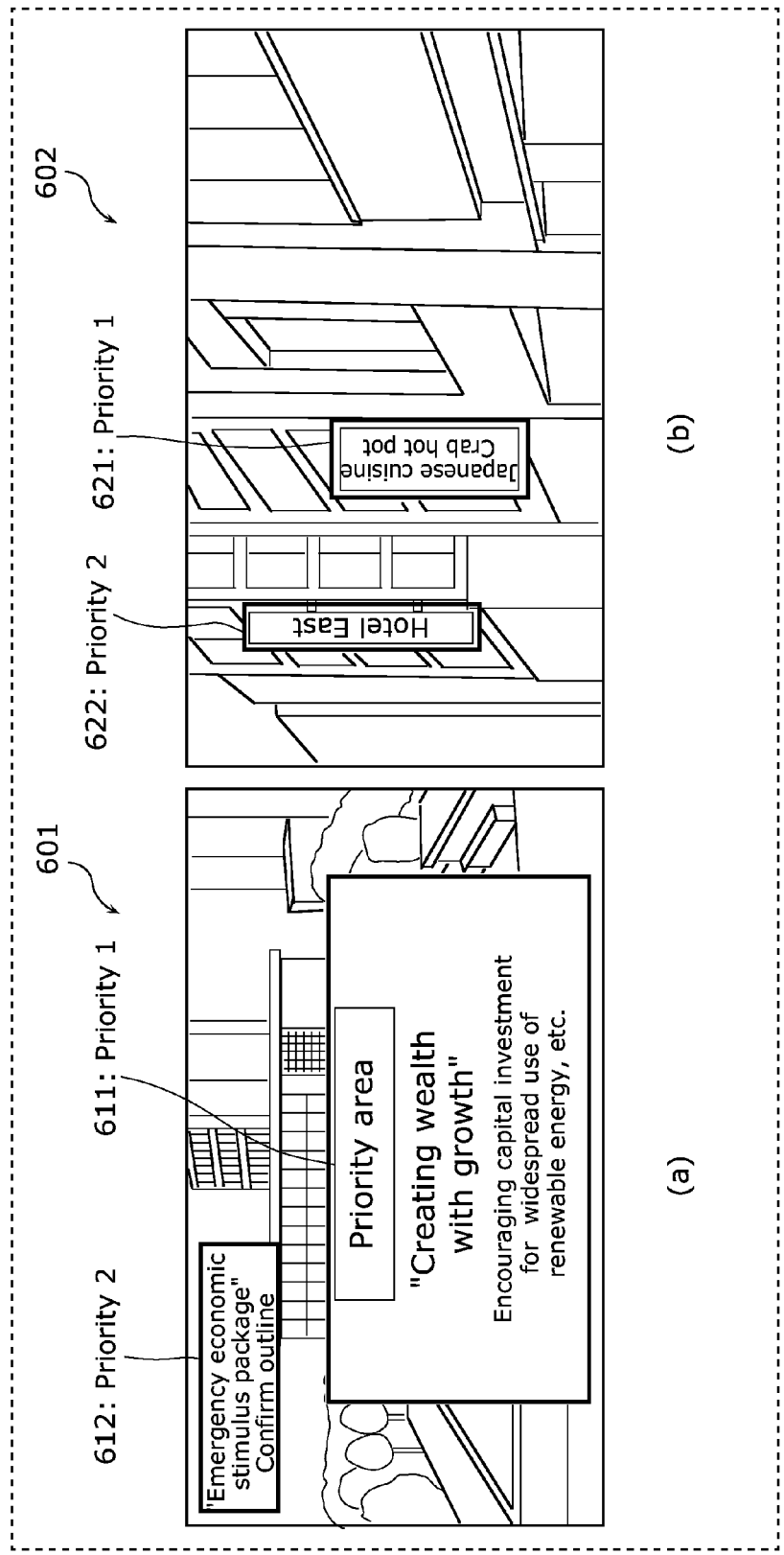
FIG. 6 is a second explanation diagram for the method of setting a priority according to the embodiment.

FIG. 6 is a second explanation diagram for the method of setting a priority according to the present embodiment. The following describes, with reference to FIG. 6, a method of setting a priority based on a display position, performed by the priority setting unit 105.

An image 601 illustrated in (a) in FIG. 6 includes character region images 611 and 612 as partial content items. The priority setting unit 105 sets, based on a display position of each of the character region images, a higher priority to the composition information item of the character region image, as a distance from the display position to the center of the image decreases. Here, the display position of the character region image 611 is closer to the center of the image than the display position of the character region image 612, and thus priorities 1 and 2 are set to the composition information items of the character region images 611 and 612, respectively.

In the same manner as above, the priority setting unit 105 sets priorities 1 and 2 to the composition information items of the character region images 621 and 622, respectively, which are included in an image 602 illustrated in (b) in FIG. 6.

Figure 7:
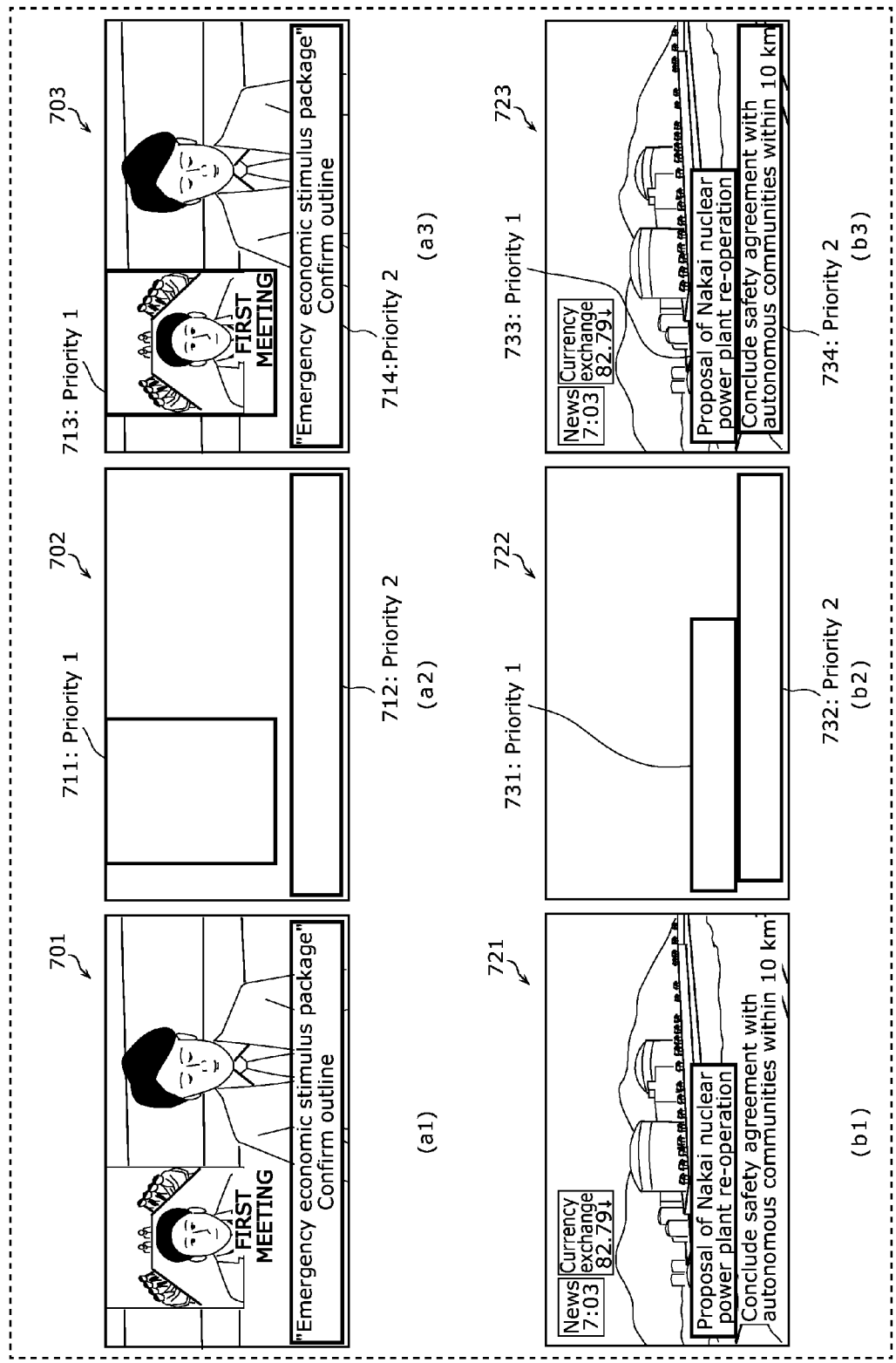
FIG. 7 is a third explanation diagram for the method of setting a priority according to the embodiment.

FIG. 7 is a third explanation diagram for the method of setting a priority according to the present embodiment. The following describes, with reference to (a1) to (a3) in FIG. 7, a method of setting a priority based on a template, performed by the priority setting unit 105. Here, a template indicates a feature of a screen configuration of video content according to a genre, in which a region in a screen image and a priority of the region are associated with each other.

An image 701 illustrated in (a1) in FIG. 7 is an image of a scene in a news program. In the image 701, a headline image indicating the details of news and a headline text indicating the details of the news are displayed.

The template 702 illustrated in (a2) in FIG. 7 includes a region 711 and a region 712. The region 711 is located in the upper left in the screen image and has lengths substantially the same in the lengthwise direction and the lateral direction (substantially square). The region 712 is horizontally long and located in the lower portion in the screen image. The region 711 is associated with a priority 1, and the region 712 is associated with a priority 2. The template 702 is a template suitable for being applied to a scene in which a headline image and a headline text which indicate the details of news as in the image 701. In a screen image such as the image 701, a region in which the details of news are indicated with use of an image is included for allowing a user to easily recognize the details of the news. Since the region is considered to be most significantly related to the details of the news, a relatively high priority is set to a composition information item of the region 711 corresponding to the region, by applying the template 702. In addition, in a screen image such as the image 701, a region in which the details of news are indicated with use of a character is further included for allowing a user to easily recognize the details of the news. New details or further details of the details of the news corresponding to the above-described headline image are displayed in this region, and the region is considered to significantly be related to the details of the news following the above-described headline image. Accordingly, a second highest priority after the priority of the composition information item of the region 711 is set to a composition information item of the region 712 corresponding to the region by applying the template 702.

In an image 703 illustrated in (a3) in FIG. 7, the priorities set by the priority setting unit 105 to the composition information items included in the image 701 illustrated in (a1) in FIG. 7 are indicated.

The priority setting unit 105 extracts partial content items included in the image 701, and determines whether or not the extracted partial content items are included in any of the regions in the template 702. As a result of the determining, the priority setting unit 105 sets the priority associated with the region including a partial content item, as a priority of a composition information item of the partial content item. More specifically, a character region image 713 that is a partial content item extracted from the image 701 is included in the region 711 of the template 702, and thus the priority 1 that is a priority associated with the region 711 is set as a priority of the composition information item of the character region image 713. In the same manner as above, the priority 2 that is a priority associated with the region 712 is set as a priority of the composition information item of the character region image 714. It is to be noted that a priority of the composition information item of each of the character region images may be determined when the character region images are each included fully in a region of the template, and a priority of the composition information item of each of the character region images may be determined when the character region images are each included in a portion of a region of the template. In the latter case, a priority may be adjusted according to a ratio of the character region image included in the template.

The following describes, with reference to (b1) to (b3) in FIG. 7, a method of setting a priority based on a template, performed by the priority setting unit 105.

An image 721 illustrated in (b1) in FIG. 7 is an image of a scene in a news program. In the image 721, a headline image indicating the details of news and a text indicating further details of the news are displayed.

A template 722 illustrated in (b2) in FIG. 7 includes a region 732 and a region 731. The region 732 is horizontally long and located in a lower portion in the screen image, and the region 731 is horizontally long and located in an upper left of and substantially adjacent to the region 732. The region 731 is associated with a priority 1, and the region 732 is associated with a priority 2. The template 722 is a template suitable for being applied to a scene in which a headline item and text which indicate the details of the news are displayed as in the image 721. In a screen image such as the image 721, a region in which the details of news are indicated with use of relatively short terms for allowing a user to easily recognize the details of the news. Since the region is considered to be most significantly related to the details of the news, a relatively high priority is set to a composition information item of the region 731 corresponding to the region, by applying the template 722. In addition, in a screen image such as the image 701, a region is included in which the details of news are indicated for allowing a user to easily recognize the details of the news. New details or further details of the details of the news corresponding to the above-described headline image are displayed in this region, and the region is considered to be significantly related to the details of the news following the above-described headline image. Accordingly, a second highest priority after the priority of the composition information item of the region 731 is set to a composition information item of the region 732 corresponding to the region, by applying the template 722.

In an image 723 illustrated in (b3) in FIG. 7, the priorities set by the priority setting unit 105 to the composition information items included in the image 721 illustrated in (b1) in FIG. 7 are indicated.

The priority setting unit 105 sets, in the same manner as above, priorities 1 and 2 to character region images 733 and 734, respectively, which are partial content items included in the image 721.

Figure 8:
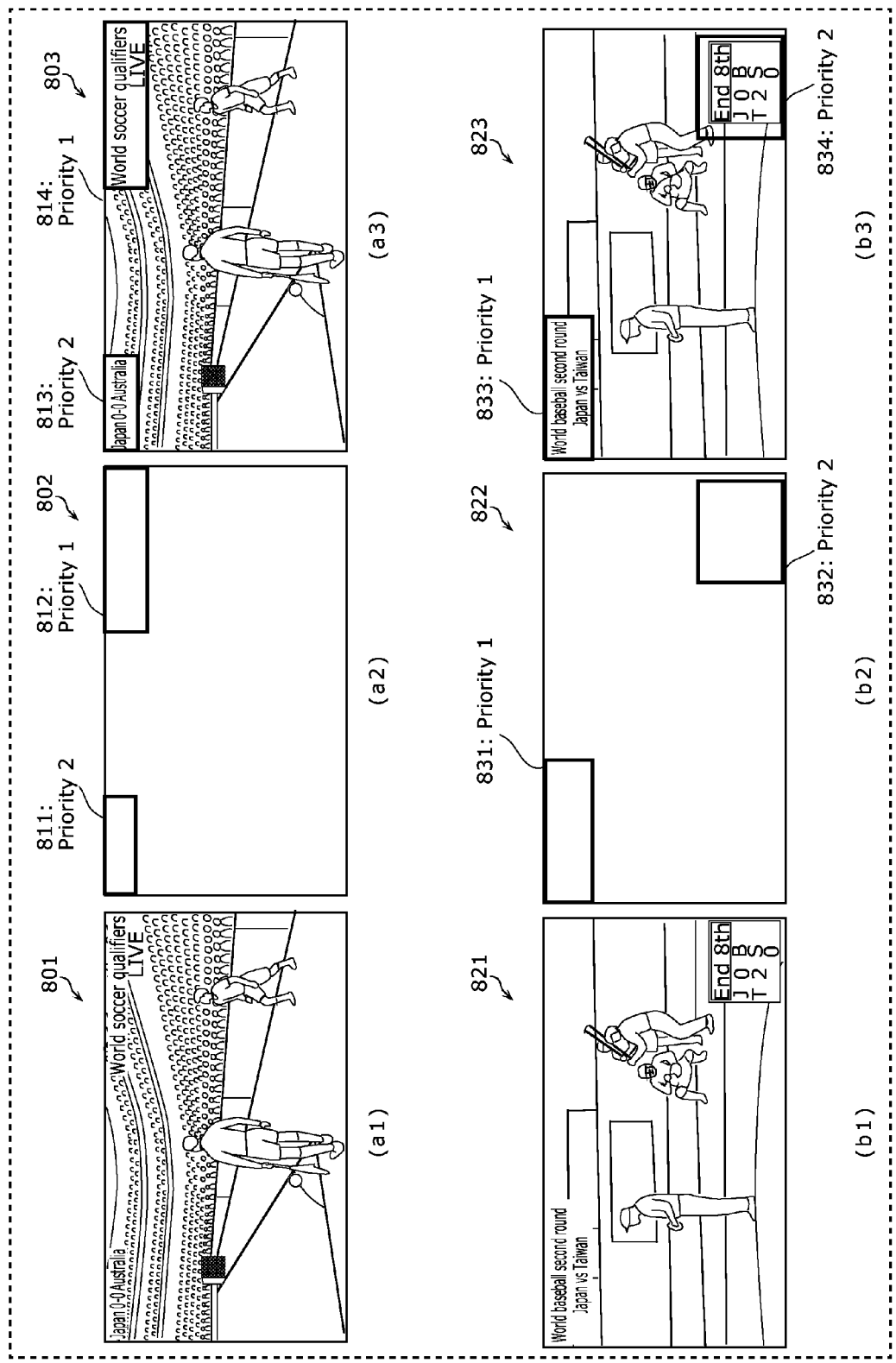
FIG. 8 is a fourth explanation diagram for the method of setting a priority according to the embodiment.

FIG. 8 is a fourth explanation diagram for the method of setting a priority according to the present embodiment. The following describes, with reference to (a1) to (a3) in FIG. 8, a method of setting a priority based on a template, performed by the priority setting unit 105.

An image 801 illustrated in (a1) in FIG. 8 is an image of a scene, in a soccer program, in which a title of the game and a progress status (score) of the game are displayed.

A template 802 illustrated in (a2) in FIG. 8 includes a region 811 and a region 812. The region 811 is horizontally long and located in the upper left of the screen image. The region 812 is horizontally long and located in the upper right of the screen image. The region 812 is associated with a priority 1, and the region 811 is associated with a priority 2. The template 802 is a template suitable to be applied to a scene of a soccer program such as the image 801. In a screen image such as the image 801, there is a region in which a title of the game is indicated for allowing a user to easily recognize the title of the game. Since the region is considered to be most significantly related to the details of the soccer program, a relatively high priority is set to a composition information item of the region 812 corresponding to the region, by applying the template 802. In addition, in a screen image such as the image 801, there is a region in which a progress status of the game is indicated. Since the progress status of the game is not fixed as a composition information item of the video content (in other words, the progress status changes as the game progresses), a priority lower than the priority of the composition information item of the region 812 is set to the composition information item of the region 811 corresponding to the region in which the progress status of the game is indicated, by using the template 802.

In an image 803 illustrated in (a3) in FIG. 8, the priorities set by the priority setting unit 105 to the composition information items included in the image 801 illustrated in (a1) in FIG. 8 are indicated.

The priority setting unit 105 sets, in the same manner as above, priorities 2 and 1 to character region images 813 and 814, respectively, which are partial content items included in the image 803.

The following describes, with reference to (b1) to (b3) in FIG. 8, a method of setting a priority based on a template, performed by the priority setting unit 105.

An image 821 illustrated in (b1) in FIG. 8 is an image of a scene in a baseball program, in which a title of the game and a progress status (score) of the game are displayed.

A template 822 illustrated in (b2) in FIG. 8 includes a region 831 and a region 832. The region 831 is horizontally long and located in the upper left of the screen image. The region 832 is located in the lower right of the screen image and has lengths substantially the same in the lengthwise direction and the lateral direction (substantially square). The region 831 is associated with a priority 1, and the region 832 is associated with a priority 2. The template 822 is a template suitable to be applied to a scene of a baseball program such as the image 821. In a screen image such as the image 801, there is a region in which a title of the game is indicated for allowing a user to easily recognize the title of the baseball game. Since the region is considered to be most significantly related to the details of the baseball program, a relatively high priority is set to a composition information item of the region 831 corresponding to the region by applying the template 822. In addition, in a screen image such as the image 821, there is a region in which a progress status of the game is indicated. Since the progress status of the game is not fixed as a composition information item of the video content (in other words, the progress status changes as the game progresses), a priority lower than the priority of the composition information item of the region 831 is set to the composition information item of the region 832 corresponding to the region in which the progress status is indicated, by applying the template 822.

The priority setting unit 105 sets, in the same manner as above, priorities 1 and 2 to character region images 833 and 834, respectively, which are partial content items included in the image 823.

An example of the method of setting a priority of a composition information item using a template different for each type of video content has been described. In order to determine the type of video content, information on a genre of the video content which is included in meta-information of the video content may be used, or a genre of the video content may be obtained from a partial content item of the video content. In addition, not only the templates exemplified above, but also any templates can be used as long as a region in a screen image and a priority of the region are associated with each other in the template. Furthermore, the template may be a region image pattern as illustrated above, or may be information in which information indicating a region in an image is associated with information indicating a priority of the region.

Figure 9:
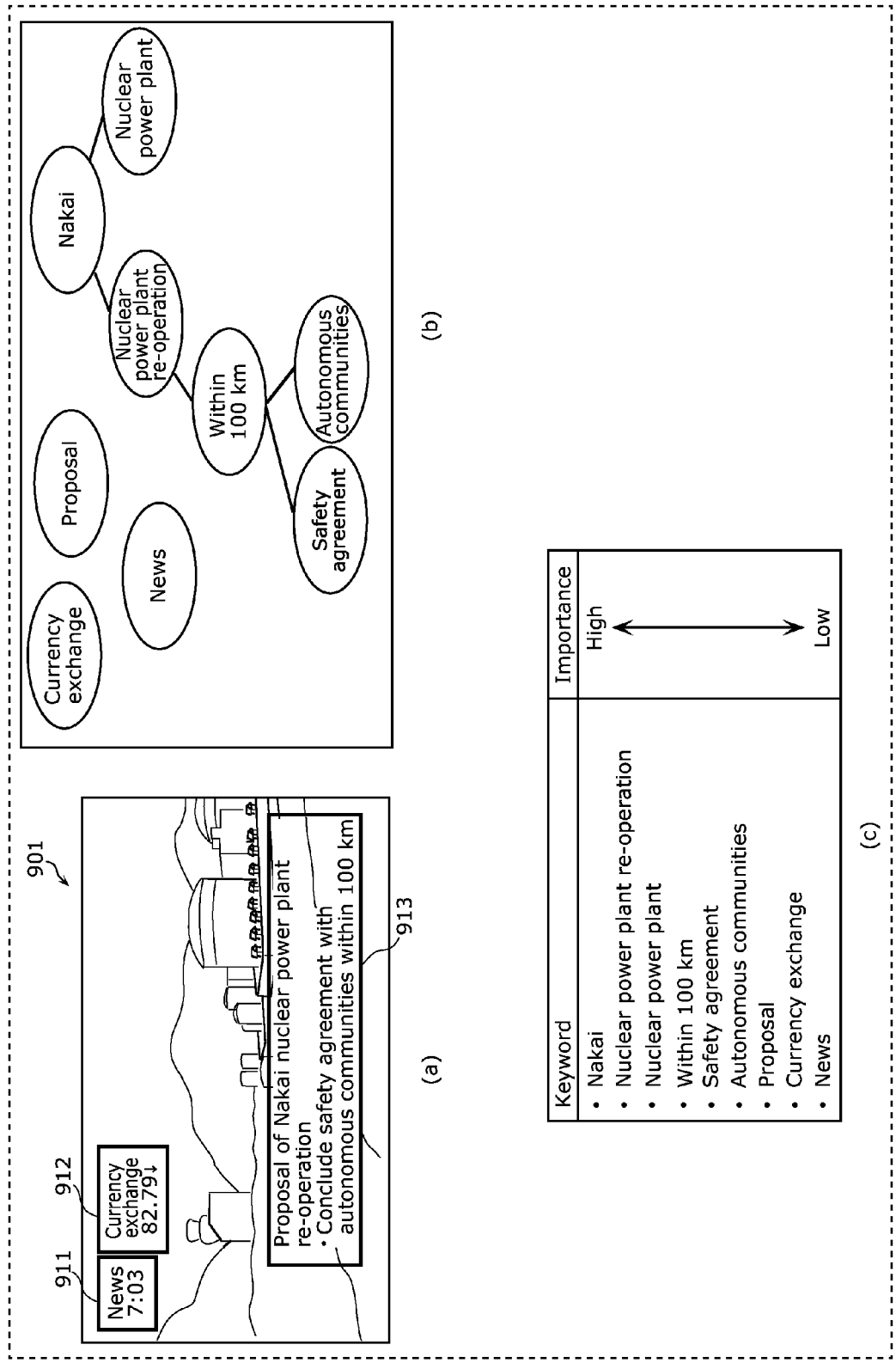
FIG. 9 is a fifth explanation diagram for the method of setting a priority according to the embodiment.

FIG. 9 is a fifth explanation diagram for the method of setting a priority according to the present embodiment. The following describes a method of setting a priority for an image 901 illustrated in (a) in FIG. 9, using an association dictionary by the priority setting unit 105. Here, the association dictionary indicates a term and another term which is related to the term in association with each other. More specifically, the association dictionary indicates a given term in association with another term related to the given term such that the related term depends on the given term.

As illustrated in (a) in FIG. 9, the image 901 includes character region images 911, 912, and 913 as partial content items.

The priority setting unit 105 generates a chart ((b) in FIG. 9, hereinafter also referred to as an association term tree) in which composition information items of the character region images 911, 912, and 913 are arranged according to dependency between terms listed in the association dictionary. Since a term "Nakai" is associated with a term "nuclear power plant re-operation" and a term "nuclear power plant" in the association dictionary, the term "nuclear power plant re-operation" and the term "nuclear power plant" are each connected to and below the term "Nakai" by liens indicating the dependency in (b) in FIG. 9. In addition, terms "proposal", "currency exchange", and "news", which are terms in the composition information items of the character region images 911, 912, and 913 and having no association with another term, are each present independently without being connected by a line.

The priority setting unit 105 sets a priority of a term by referring to the association term tree ((c) in FIG. 9). Here, the priority setting unit 105 sets a higher priority to a term as a level of the term in the association term tree increases. More specifically, since the term "Nakai" is at the highest level in the association term tree, the highest priority is set to the term "Nakai". According to the association term tree, the terms "nuclear power plant re-operation", "nuclear power plant", "within 100", and terms "safety agreement" and "autonomous communities" follows the term "Nakai". Lowest priorities are set to the terms "proposal", "currency exchange", and "news" which have no association with another term.

Figure 10:
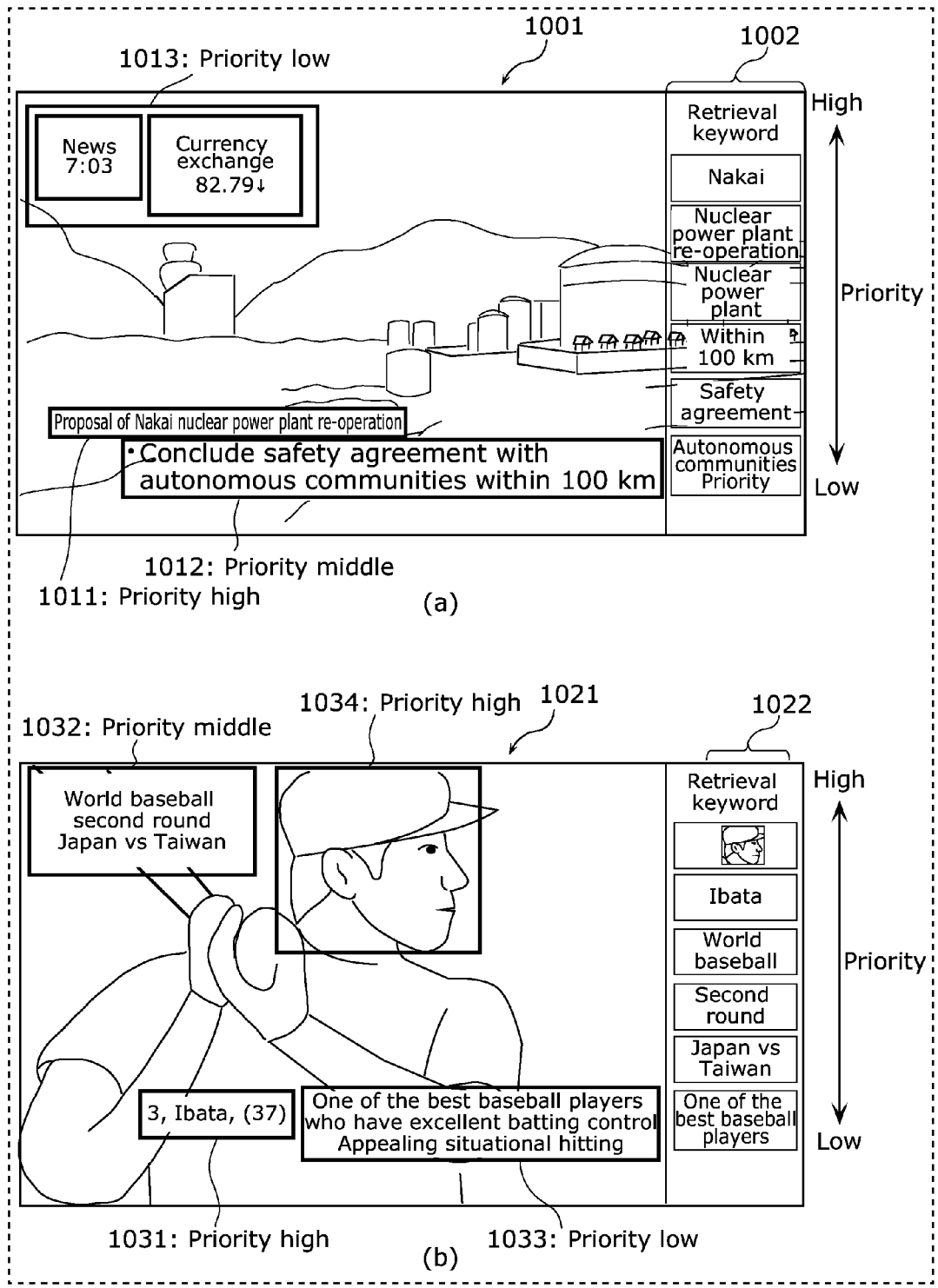
FIG. 10 is an explanation diagram for displaying of composition information items according to the embodiment.

FIG. 10 is a diagram explaining display of the composition information item according to the present embodiment.

In (a) in FIG. 10, an example of an image displayed on a display screen when an image 1001 (equivalent to the image 721) is displayed together with the composition information items on the display screen is illustrated. Priorities of composition information items of character region images 1011, 1012, and 1013 which are partial content items of the image 1001 are set as high, middle, and low, respectively. In addition, for the terms "Nakai" and "nuclear power plant re-operation" which are composition information items of the character region image 1011, priorities higher than a priority of the term "nuclear power plant re-operation" is set to the term "Nakai" based on the association dictionary. In such a case, the composition information item (also described as a retrieval keyword) is displayed at higher position as the priority of the composition information item increase, in a region 1002 at the right end of the image.

In (b) in FIG. 10, an example of an image displayed on a display screen when an image 1021 (equivalent to the image 201) is displayed together with the composition information items on the display screen is illustrated. A priority of a composition information item of an object image 1034 that is a partial content item of the image 1021 is set as high, and priorities of composition information items of character region images 1031, 1032, and 1033 that are partial content items of the image 1021 are set as high, middle, and low, respectively. In such a case, in the same manner as above, the composition information item (also described as a retrieval keyword) is displayed at a higher position as the priority of the composition information item increases, in a region 1002 at the right end of the image. In the case where an object image is present as a composition information item, the object image is displayed in a reduced size.

It is to be noted that the region 1002 in which composition information items are displayed may be displayed by being superimposed on the image 1001, or may be displayed in a free region resulting from reducing the width and being moved to the left, of the image 1001. When the region 1002 is displayed by superimposed display, the image 1001 may be visually checked by a user by making the region 1002 translucent and superimposed. In addition, the same holds true for the region 1022 in which the composition information items are displayed.

In the above description, each of the composition information items is located at a higher position as a priority of the composition information item increases, in other words, a position of each of the composition information item is set according to the priority. Instead of the above-described manner, the size of a character of each of the composition information items displayed may be changed according to the priority. More specifically, the character may be displayed in a larger size as the priority increases. In addition, instead of the above-described manner, the composition information items having high priorities may be displayed in a color different from a color generally used often for the purpose of displaying characters, and the composition information items having low priorities may be displayed in the color generally used often.

It has been described that an image resulting from reducing an object image is displayed in the region 1022 when the object image is present as a composition information item. Instead of this, a result of converting a name corresponding to the object image (for example, a name of a person when the object image is a face of the person) which is obtained from the object image through image retrieval, into an image again through retrieval, may be used. With this, it is also possible, even when a profile of a person is displayed on an image and it is difficult for a user to recognize the person, to display an image of a frontal face of the person as a composition information item, allowing the user to easily recognize the person.

[1-2. Operation]

Figure 11:
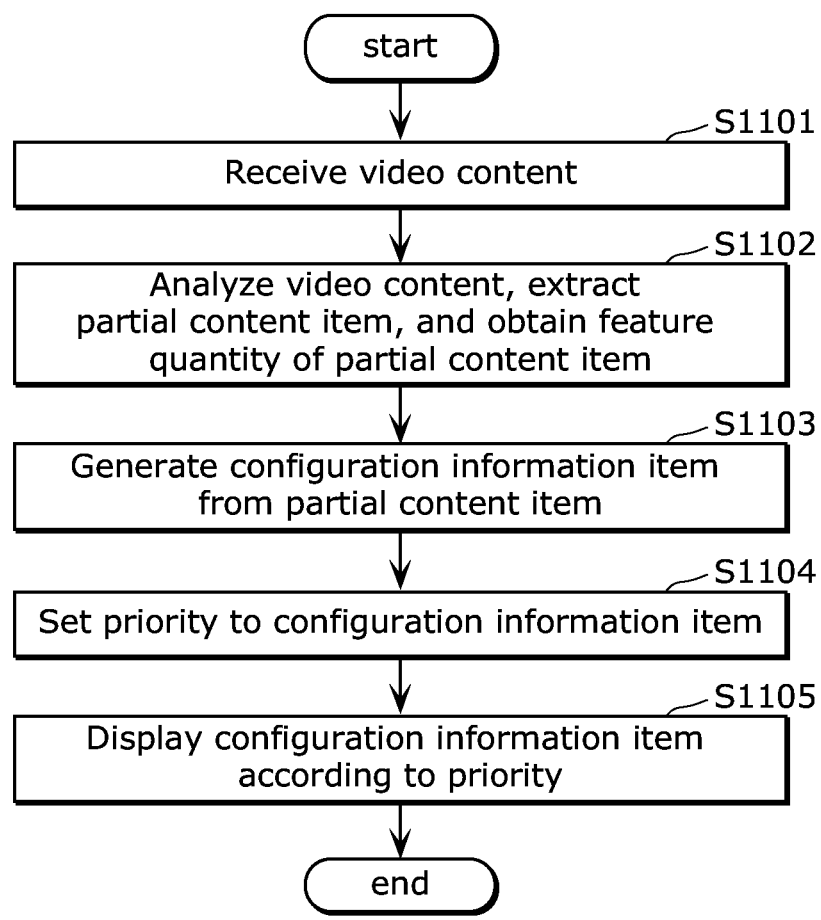
FIG. 11 is a flowchart illustrating a method of displaying a composition information item performed by the video receiving apparatus according to the embodiment.

FIG. 11 is a flowchart illustrating a method of displaying a composition information item, performed by the video receiving apparatus 1 according to the present embodiment.

First, the receiving unit 101 receives a video content item (Step S1101).

Next, the extracting unit 102 analyzes the video content received by the receiving unit 101, thereby extracting a partial content item that is a portion of the video content. The extracting unit 102 then obtains a feature quantity indicating a feature of the extracted partial content item (Step S1102).

Next, the information generating unit 103 converts the partial content item extracted by the extracting unit 102 into a composition information item which is information indicating the partial content item and including a character or an image (Step S1103). When converting the partial content item into a composition information item, the information generating unit 103 may communicate with an external retrieval device via the communication unit 104 as necessary.

Next, the priority setting unit 105 sets a priority which is determined based on the feature quantity extracted from the partial content item by the extracting unit 102, and indicates importance of the partial content item in the video content (Step S1104).

Then the composition information item is displayed on a display screen according to the priority which has been set by the priority setting unit 105 (Step S1105).

[1-3. Advantageous Effects Etc.]

As described above, the video receiving apparatus according to the present embodiment includes: a receiving unit configured to receive video content; an extracting unit configured to extract a partial content item which is a portion of the video content by analyzing the video content, to obtain a feature of the partial content item which has been extracted, the feature being characteristic within the video content; an information generating unit configured to generate a composition information item from the partial content item, the composition information item indicating the partial content item and including at least one of a character and an image; a priority setting unit configured to set a priority of the composition information item generated from the partial content item, based on the feature obtained from the partial content item, the priority indicating a degree of association between the video content and the composition information item; and a display control unit configured to control display of the composition information item on a display screen according to the priority of the composition information item set by the priority setting unit.

With this, the video receiving apparatus presents to a user a composition information item generated from video content, according to a priority indicating a degree of association between the composition information item and the video content. The partial content item corresponding to the composition information item is expressed reflecting the degree of association with the video content in the video content. The video receiving apparatus sets a priority of a composition information item based on an aspect of expression of the partial content item as described above. This allows a user to not only simply view an information item included in the video content, but also know the degree of association of the information item in the video content. It is thus possible for the user to select an information item which the user desires, from among information items with higher degrees of association. Thus, the video receiving apparatus is capable of presenting a retrieval item that facilitates selection performed by a user.

In addition, the extracting unit may extract, as the partial content item, a character region image which is a partial image of an image included in the video content and includes a region in which a character is displayed, to obtain as the feature at least one of a display position, a display color, and a character size, within the image, of the character region image which has been extracted, the information generating unit may generate a composition information item from the character region image, the composition information item including the character contained in the character region image, and the priority setting unit may set the priority of the composition information item generated from the character region image, based on the at least one of the display position, the display color, and the character size that have been obtained by the extracting unit.

With this, the video receiving apparatus is capable of determining a priority of a composition information item corresponding to a character, in consideration of at least one of the display position, the display color, and the character size of the character included in video content. The display position, the display color, and the character size of the character included in the video content reflects the degree of association between the video content and the character. The video receiving apparatus is capable of determining properly a priority of a composition information item because the video receiving apparatus determines the priority using at least one of information items described above.

In addition, the priority setting unit may set a higher priority to the composition information item generated from the character region image, as a distance from the character region image to a center of the image decreases.

With this, the video receiving apparatus is capable of setting higher priorities for the composition information items corresponding to characters displayed closer to the center of the image. The character displayed in the image has a higher degree of association with the video content as a distance from the character to the center of the image decreases. The video receiving apparatus is capable of determining properly a priority of the composition information item because the video receiving apparatus determines the priority using these items of information.

In addition, the video receiving apparatus may further include a storage unit in which a template is stored, the template indicating a position and size of a certain region in the image in association with a priority of the certain region, wherein the priority setting unit may set the priority associated in the template with a region in the image in which the character region image is displayed, as the priority of the composition information item generated from the character region image.

With this, the video receiving apparatus is capable of determining, with use of the template, a priority of a composition information item corresponding to a character region image in an image. The template indicates a feature of a screen configuration of video content according to a genre, of which a region in a screen image and a priority of the region are associated with each other. The video receiving apparatus is thus capable of determining more properly a priority of a composition information item.

In addition, the extracting unit may extract, as the partial content item, meta-information included in the video content, to obtain a genre of the video content based on the meta-information which has been extracted, the template is stored in the storage unit for each genre of video content, and the priority setting unit may set a priority of the composition information item generated from the character region image, by referring to the template corresponding to the genre of the video content obtained by the extracting unit.

With this, the video receiving apparatus is capable of obtaining a genre of video content based on meta-information included in the video content, and determining a priority of a composition information item using a template corresponding to the genre.

In addition, the extracting unit may extract, as the partial content item, an object image which is a partial image of an image included in the video content and includes a region in which an object is displayed, to obtain as the feature at least one of a display position and a display size, within the image, of the object image which has been extracted, the information generating unit may generate a composition information item from the object image, the composition information item indicating the object image and including at least one of a character and an image, and the priority setting unit may set the priority of the composition information item generated from the object image, based on the at least one of the display position and the display size which have been obtained by the extracting unit.

With this, the video receiving apparatus is capable of determining a priority of a composition information item corresponding to an object (a person or a face of a person) included in video content, in consideration of at least one of the display position and the character size of the object. The display position of the object and the character size included in the video content reflects the degree of association between the video content and the object. The video receiving apparatus is capable of determining properly a priority of a composition information item because the video receiving apparatus determines the priority using at least one of information items described above.

In addition, the priority setting unit may set a higher priority to the composition information item generated from the object image, as a distance from the object image to a center of the image decreases.

With this, the video receiving apparatus is capable of setting higher priorities for the composition information items corresponding to objects displayed closer to the center of the image. The object displayed on the image has a higher degree of association with the video content as a distance from the object to the center of the image decreases. The video receiving apparatus is capable of determining properly a priority of the composition information item because the video receiving apparatus determines the priority using these items of information.

In addition, the priority setting unit may set a higher priority to the composition information item generated from the object image, as a display size of the object image in the image increases.

With this, the video receiving apparatus is capable of setting higher priorities to the composition information items corresponding to objects displayed in larger sizes in the image. The object displayed on the image has a higher degree of association with the video content as a display size of the object displayed in the image increases. The video receiving apparatus is capable of determining properly a priority of the composition information item because the video receiving apparatus determines the priority using these items of information.

In addition, the extracting unit may extract, as the partial content item, audio included in the video content, to obtain as the feature at least one of a sound pressure, a pitch, and a tempo, of the audio which has been extracted, the information generating unit may generate, from the audio, a composition information item including a character resulting from converting the audio, and the priority setting unit may set the priority of the composition information item generated from the audio, based on the at least one of the sound pressure, the pitch, and the tempo, which has been obtained by the extracting unit.

With this, the video receiving apparatus is capable of setting a priority of a composition information item corresponding to an object, in consideration of at least one of the sound pressure, the pitch, and the tempo, of the audio included in the video content. The sound pressure, the pitch, and the tempo, included in the video content reflect the degree of association between the video content and the object. The video receiving apparatus is capable of setting properly a priority of a composition information item because the video receiving apparatus sets the priority using at least one of information items described above.

In addition, the priority setting unit may set a higher priority to the composition information item resulting from converting the audio, as the sound pressure of the audio increases.

With this, the video receiving apparatus is capable of setting higher priorities for the composition information items corresponding to audio having higher sound pressures. The audio has a higher degree of association with the video content as the sound pressure increases. The video receiving apparatus is capable of determining properly a priority of the composition information item because the video receiving apparatus determines the priority using these items of information.

In addition, the storage unit may further store an association dictionary indicating a term in association with another term related to the term, the partial content item may include a plurality of partial content items, the extracting unit may extract the plurality of partial content items, to obtain a feature of each of the plurality of partial content items, the composition information item may include a plurality of composition information items, the information generating unit may generate the plurality of composition information items from each of the plurality of partial content items, and the priority setting unit may generate an association term tree by referring to the association dictionary, and set a higher priority to the composition information item, as a level of the composition information item in the association term tree increases, the association term tree indicating dependencies between the plurality of composition information items generated by the information generating unit.

With this, the video receiving apparatus is capable of sets a higher priority to a composition information item included in video content and corresponding to an object, in consideration of the degree of association between the composition information item and another composition information item, as the degree of association between the composition information item and the another composition information item increases. The video receiving apparatus is capable of determining properly a priority of the composition information item because the video receiving apparatus determines the priority using these items of information.

In addition, the display control unit may control the display in such a manner that the composition information item is displayed at a higher position on the display screen, as the priority of the composition information item increases.

With this, the video receiving apparatus is capable of displaying the composition information item of a high priority at a position easily visually checked by a user on the display screen.

In addition, the display control unit may control the display in such a manner that a predetermined number of the plurality of composition information items are selected in descending order of priorities, and only the predetermined number of the plurality of composition information items which have been selected may be displayed on the display screen.

With this, the video receiving apparatus is capable of presenting to a user only the composition information item of a high priority, among a plurality of composition information items included in the video content.

In addition, the video receiving apparatus may further include a display unit including the display screen.

With this, the video receiving apparatus is capable of presenting to a user a composition information item together with video content, using the display screen included in the video receiving apparatus.

In addition, a method of controlling information display for use in a video receiving apparatus according to the present embodiment includes: receiving video content; extracting a partial content which is a portion of the video content by analyzing the video content, to obtain a feature of the partial content item which has been extracted, the feature being characteristic within the video content; generating a composition information item from the partial content item, the composition information item indicating the partial content item and including at least one of a character and an image; setting a priority of the composition information item generated from the partial content item, based on the feature obtained from the partial content item, the priority indicating a degree of association between the video content and the composition information item; and controlling display of the composition information item on a display screen according to the priority of the composition information item set in the setting.

With this, the advantageous effects equivalent to the advantageous effects of the above-described video receiving apparatus are produced.

As described above, exemplary embodiments are described as exemplifications of the technique disclosed in the present application. However, the technique according to the present disclosure is not limited to the foregoing embodiments, and can also be applied to embodiments to which a change, substitution, addition, or omission is executed as necessary. In addition, each of the components described in the above-described embodiment may be combined to set a new embodiment.

Although only an exemplary embodiment of the present disclosure has been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The video receiving apparatus according to the present disclosure is applicable to, for example, to a video receiving apparatus which presents a retrieval item included in video together with association with the video.

The invention claimed is:

1. A video receiving apparatus, comprising:
a receiving unit configured to receive video content;
an extracting unit configured to extract a partial content item by cutting out a portion of the video content by analyzing the video content, to obtain a feature of the partial content item which has been extracted, the feature being characteristic within the video content;
an information generating unit configured to generate a composition information item from the partial content item, the composition information item including at least one of a character or an object, the at least one of a character or an object being an image based on the partial content item;
a priority setting unit configured to set a priority of the composition information item generated from the partial content item, using the feature of the partial content item, the feature being characteristic within the video content and having been obtained from the partial content item extracted by cutting out the portion of the video content, the priority indicating a degree of association between the video content and the composition information item; and
a display control unit configured to control display of the composition information item on a display screen according to the priority of the composition information item set by the priority setting unit.

2. The video receiving apparatus according to claim 1, wherein the extracting unit is configured to extract, as the partial content item, a character region image which is a partial image of an image included in the video content and includes a region in which a character is displayed, to obtain as the feature at least one of a display position, a display color, and a character size, within the image, of the character region image which has been extracted,
the information generating unit is configured to generate a composition information item from the character region image, the composition information item including the character contained in the character region image, and
the priority setting unit is configured to set the priority of the composition information item generated from the character region image, based on the at least one of the display position, the display color, and the character size that have been obtained by the extracting unit.

3. The video receiving apparatus according to claim 2, wherein the priority setting unit is configured to set a higher priority to the composition information item generated from the character region image, as a distance from the character region image to a center of the image decreases.

4. The video receiving apparatus according to claim 2, further comprising
a storage unit in which a template is stored, the template indicating a position and size of a certain region in the image in association with a priority of the certain region,
wherein the priority setting unit is configured to set the priority associated in the template with a region in the image in which the character region image is displayed, as the priority of the composition information item generated from the character region image.

5. The video receiving apparatus according to claim 4,
wherein the extracting unit is configured to extract, as the partial content item, meta-information included in the video content, to obtain a genre of the video content based on the meta-information which has been extracted,
the template is stored in the storage unit for each genre of video content, and
the priority setting unit is configured to set a priority of the composition information item generated from the character region image, by referring to the template corresponding to the genre of the video content obtained by the extracting unit.

6. The video receiving apparatus according to claim 1,
wherein the extracting unit is configured to extract, as the partial content item, an object image which is a partial image of an image included in the video content and includes a region in which an object is displayed, to obtain as the feature at least one of a display position and a display size, within the image, of the object image which has been extracted,
the information generating unit is configured to generate a composition information item from the object image, the composition information item indicating the object image and including at least one of a character and an image, and
the priority setting unit is configured to set the priority of the composition information item generated from the object image, based on the at least one of the display position and the display size which have been obtained by the extracting unit.

7. The video receiving apparatus according to claim 6,
wherein the priority setting unit is configured to set a higher priority to the composition information item generated from the object image, as a distance from the object image to a center of the image decreases.

8. The video receiving apparatus according to claim 6,
wherein the priority setting unit is configured to set a higher priority to the composition information item generated from the object image, as a display size of the object image in the image increases.

9. The video receiving apparatus according to claim 1,
wherein the extracting unit is configured to extract, as the partial content item, audio included in the video content, to obtain as the feature at least one of a sound pressure, a pitch, and a tempo, of the audio which has been extracted,
the information generating unit is configured to generate, from the audio, a composition information item including a character resulting from converting the audio, and
the priority setting unit is configured to set the priority of the composition information item generated from the audio, based on the at least one of the sound pressure, the pitch, and the tempo, which has been obtained by the extracting unit.

10. The video receiving apparatus according to claim 9,
wherein the priority setting unit is configured to set a higher priority to the composition information item resulting from converting the audio, as the sound pressure of the audio increases.

11. The video receiving apparatus according to claim 4,
wherein the storage unit is configured to further store an association dictionary indicating a term in association with another term related to the term,
the partial content item comprises a plurality of partial content items,
the extracting unit is configured to extract the plurality of partial content items, to obtain a feature of each of the plurality of partial content items,
the composition information item comprises a plurality of composition information items,
the information generating unit is configured to generate the plurality of composition information items from each of the plurality of partial content items, and
the priority setting unit is configured to generate an association term tree by referring to the association dictionary, and set a higher priority to the composition information item, as a level of the composition information item in the association term tree increases, the association term tree indicating dependencies between the plurality of composition information items generated by the information generating unit.

12. The video receiving apparatus according to claim 1,
wherein the display control unit is configured to control the display in such a manner that the composition information item is displayed at a higher position on the display screen, as the priority of the composition information item increases.

13. The video receiving apparatus according to claim 1,
wherein the display control unit is configured to control the display in such a manner that a predetermined number of the plurality of composition information items are selected in descending order of priority, and only the predetermined number of the plurality of composition information items which have been selected are displayed on the display screen.

14. The video receiving apparatus according to claim 1, further comprising
a display unit including the display screen.

15. A method of controlling information display for use in a video receiving apparatus, the method comprising:
receiving video content;
extracting a partial content item by cutting out a portion of the video content by analyzing the video content, to obtain a feature of the partial content item which has been extracted, the feature being characteristic within the video content;
generating a composition information item from the partial content item, the composition information item including at least one of a character or an object, the at least one of a character or an object being an image based on the partial content item;
setting a priority of the composition information item generated from the partial content item, using the feature of the partial content item, the feature being characteristic within the video content and having been obtained from the partial content item extracted by cutting out the portion of the video content, the priority indicating a degree of association between the video content and the composition information item; and controlling display of the composition information item on a display screen according to the priority of the composition information item set in the setting.

* * * * *